UNITED STATES PATENT OFFICE.

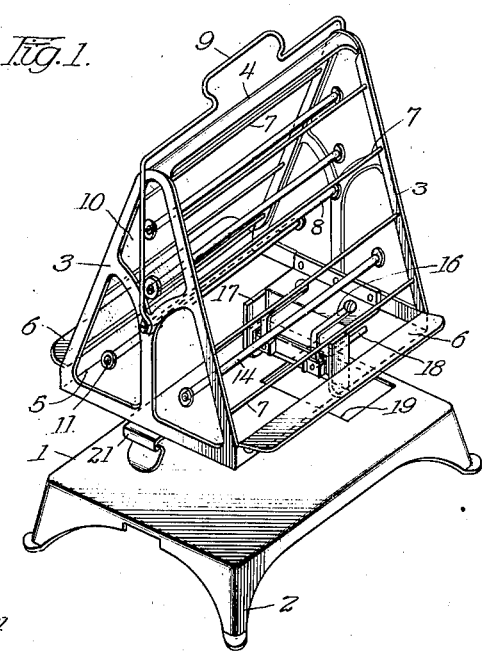
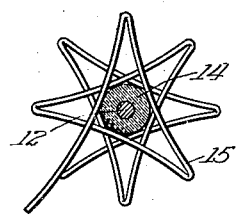
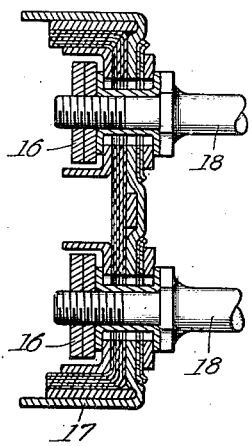
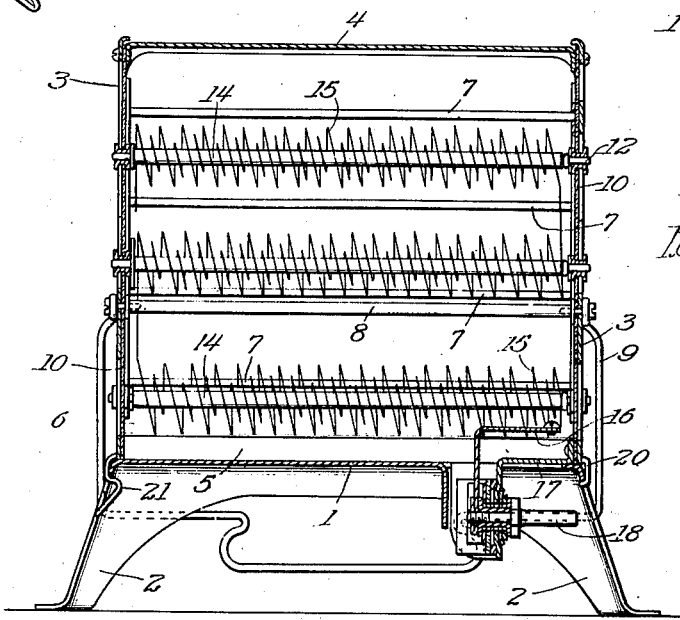
E. N. LIGHTFOOT.
ELECTRIC TOASTER.
APPLICATION FILED DEC. 26, 1912.
1,219,650.  Patented Mar. 20, 1917.

EDWIN N. LIGHTFOOT, OF NEW YORK, N. Y.

ELECTRIC TOASTER.

1,219,650.  Specification of Letters Patent.  Patented Mar. 20, 1917.

Application filed December 26, 1912. Serial No. 738,649.

*To all whom it may concern:*

Be it known that I, EDWIN N. LIGHTFOOT, a resident of New York, in the county of Bronx and State of New York, a citizen of the United States, have invented new and useful Improvements in Electric Toasters, of which the following is a full, clear, concise, and exact description, reference being had to the accompanying drawing, forming a part of this specification.

My invention relates to improvements in electric toasters.

The objects of my invention are, to provide a toaster in which the heating units are so disposed with respect to the surfaces to be toasted as to provide the maximum amount of effective radiation for a minimum expenditure of electrical energy, to insure substantially uniform radiation to all parts of the area to be toasted, to provide a construction which may be easily cleaned, to provide a toaster so arranged that the progress of the toasting may be conveniently watched without removing the bread from time to time, and to provide a construction which is light, ornamental, and economically manufactured.

Other objects and advantages will be apparent without specific reference thereto.

In the accompanying drawings I have illustrated a structure which embodies my invention and which will serve to illustrate the features thereof. Other forms may, of course, be devised which fall within the scope of the invention.

Figure 1 is a perspective view of the toaster with the toasting frame detached from the base.

Fig. 2 is a central longitudinal sectional elevation thereof.

Fig. 3 is a sectional view of the terminals.

Fig. 4 is a view of certain constructional details.

Fig. 5 is an enlarged sectional elevation of one of the heater units.

The toaster in its preferred form comprises a suitable base and a toasting frame removably secured thereto. Said base 1 has a smooth, flat top which facilitates cleaning and has suitable supporting legs 2, the entire base being preferably stamped up from a single piece of metal.

The toasting frame comprises suitable end frames 3 which are preferably of triangular outline. Said frames are spaced apart, by an upper metallic strip 4 and a pair of lower metallic strips 5, the upper part of each of said latter strips being bent outwardly to form sills 6 for supporting the two pieces of bread to be toasted simultaneously. A series of parallel rods or guards 7 are loosely mounted in said end frames 3 and are rotatable therein to facilitate cleaning. The two pieces of bread to be toasted are supported on the sills 6 and rest against guards 7 being inclined toward each other, at a sufficient angle to insure their remaining in the desired toasting position without the need of auxiliary back rests, clips, or other holding devices.

The end frames are also connected by a centrally arranged rod 8 to the opposite ends of which is secured a handle or bail, by means of which the toasting frame or in fact, the entire device may be lifted. Said bail is normally in lowermost position out of heating zone, and may be grasped with impunity and swung to its operative or vertical position.

The end frames 3 are provided with mica panels 10. The size of the toasting frame is such that when two slices of bread of average size are resting against opposite sides thereof, the bread, to a certain extent, closes the sides of the frame and together with the mica ends provide a more or less closed structure whereby convection currents are reduced. The mica ends being transparent, enable the progress of the toasting to be readily observed without removing the bread from time to time to look at it.

The mica panels have small holes therein wherein metallic eyelets 11 are secured. Suitable rods 12 are supported by said mica, being received in said eyelets. Said rods each have a shoulder 13 near one end as illustrated to lock the same in position. Each rod supports a suitable insulation tube 14 preferably of magnesia. Resistance wire 15 is mounted on each of said magnesia tubes, said wire being preferably reflexed as illustrated. The mounting of this resistance wire is claimed in my Patent No. 1046816, December 10, 1912. The ends of said resistance wire are brought down and secured to metallic terminal strips 16 which are carried by a plate or frame 17 secured to one of the end frames, said plate carrying, also, the circuit terminals 18 which are insulated therefrom and which are electrically connected to the strips 16. When the toasting frame is assembled on the base, the plate 17 projects downwardly through opening 19 in said base, whereby the circuit connections are made beneath the top surface of said base and removed from the extreme heat. The toasting frame is suitably locked to the base by a hook or catch 20 which engages one end thereof and by spring catch 21 which engages the other end thereof. The toasting frame is thus positively locked to the base but may be readily removed therefrom by forcing out the spring catch 21, raising the frame to a diagonal position and then lifting it from the base.

I have illustrated four heater units as the preferred construction. These heater units are all substantially parallel and three of them are arranged to form a triangle as clearly seen in the end view thereof. The fourth heating unit is arranged substantially in the center of said triangle. The two pieces of bread which incline toward each other also determine substantially a similar triangle of somewhat larger dimensions. The heat from the two lowermost heating units is radiated directly to the adjacent piece of bread and also in each case to the more distant piece of bread. Some of the heat is also carried upward by convection, due to the ascending currents of heated air although the intention is to eliminate convection currents as far as it is possible to do so. The middle heating unit is farther from the bread than either of the others, this arrangement being the desired one as the middle portions of the bread are heated not only by the direct radiation from said middle unit but also from the more distant units. The uppermost heating unit radiates heat directly to the upper part of the bread, which part is also heated somewhat by the ascending air currents. It will thus be seen that by virtue of the novel arrangement of heating elements described, I am enabled to heat all parts of the toasted area substantially uniformly and almost entirely by radiated heat. Although I have obtained very good results with four heating units, which number I regard as the minimum which may be used satisfactorily in the present instance, a greater number may be employed under somewhat different conditions. In any case an even number of heating units is advisable, as the free ends of the wires may then be brought out adjacent to each other, for convenience in connecting them to the terminals. The method of toasting by direct radiation is preferable to heating by convection as the latter method tends to dry out the bread. With the arrangement which I have described, the resistance wires are heated preferably to a dull red heat at which temperature the radiation is very active and the bread is toasted or browned rapidly at the surface without drying out the inner material.

The upper surface of the base being of polished metal, reflects the heat and aids in distributing the radiation evenly over the surfaces being toasted. The transparent ends not only permit the progress of the toasting to be watched, as previously stated, but add to the attractive appearance of the toaster as the glowing wire is plainly visible therethrough. The bread being supported in an inclined position, the crumbs or small fragments which drop therefrom fall upon the smooth, flat surface of the supporting base from which they may be very readily brushed subsequently by removing the toaster frame. The guard rods may also be wiped off readily as they are not only accessible but turn in their supports. Said base may also be washed whenever desired as none of the circuit terminals are mounted thereon, but are removed with the toaster frame.

It is to be understood that while I have designated the above described device as a toaster, it may, of course, be used for heating material other than bread, although it is particularly well adapted for the latter purpose. It is to be understood further that the invention is not limited to the details described and illustrated as other structures may be devised which fall within the scope of the invention as expressed in the appended claims.

I claim as my invention:

1. An electric toaster comprising a base, a skeleton frame detachably mounted thereon, said frame comprising triangular shaped end pieces joined by cross-pieces, said end pieces having insulating panels mounted in openings therein and electric heater units carried by said insulating panels.

2. An electric toaster comprising a base, a skeleton frame detachably secured to said base, said frame comprising triangular shaped end pieces joined by cross-pieces, insulating panels mounted in openings in said end pieces, electric heater units carried by said frame and supported by the insulating panels mounted in the openings in said end pieces, and electric plug terminals carried by said frame independently of said base.

3. An electric toaster comprising a base, a skeleton frame mounted thereon, said frame comprising triangular shaped end pieces joined by cross-pieces, flanges bent out from two of the lower cross-pieces to form toast supports, insulating panels mounted in openings in said end pieces and electric heater units supported by said frame by the insulating panels mounted in openings in the end pieces.

4. An electric toaster comprising a base having a flat top provided with an opening therein, a toast supporting frame having electric heater units mounted therein, said frame also carrying electric terminals near the bottom thereof adapted, when the frame is attached to the base, to project through the opening in said base so as to be accessible beneath said base, said frame having means thereon for detachably securing it to the base so that it may be readily removed from said base at will without disassembling the toaster.

5. An electric toaster having means for supporting the objects to be heated in two converging planes, parallel heating units between said planes, three of said units being located at the vertices of a triangle two of whose sides are parallel to the heating planes and a fourth unit mounted near the center of said triangle whereby a uniform radiation to the heating planes is secured.

6. An electric heater comprising a pair of end frames having openings therein, mica panels mounted in said openings and resistance units carried by said panels whereby said resistance units are insulated from the frame and said mica panels form transparent windows in said frame.

7. An electric heater comprising a pair of end frames, mica panels therein, reinforcing metallic eyelets arranged in openings in said mica panels, metallic rods each received within a pair of said eyelets at opposite ends thereof, insulating tubes carried by said rods and resistances suitably mounted on said insulating tubes, whereby said resistance is doubly insulated from said end frames.

8. An electric toaster having the outline of a prism with similar triangular shaped ends, the sides of said prism being the heating surfaces, the base of said prism constituting a heat reflecting surface, and the ends of said prism constituting transparent windows, and insulators and mechanical supports for the heating units.

9. In a device of the class described, a toasting frame having the form of a triangular prism, the end members consisting of a triangular rim with intermediate connecting webs and a bail pivoted to said webs near the middle of each triangular end.

10. An electric heater comprising a flat topped base, and a toasting frame having clips which engage opposite ends of said base, said base having an opening through which project the terminals on said toasting frame.

11. An electric toaster, comprising a toasting frame, terminal connectors carried thereby adjacent to the lower part thereof, and a supporting base for said frame, said terminals being normally below the top of said base but removable with said frame.

12. An electric heater, comprising a base, a frame mounted on said base which carries the heating elements and resilient clips carried by said frame which engage with shoulders on said base to lock the parts together.

13. In a support for a heating unit, a pair of substantially parallel insulating panels, a metallic rod supported in openings therein, said rod having a shoulder adjacent to one end thereof, and an insulating tube carried by said rod, said tube being arranged between said panels and said shoulder serving to retain said rod in position.

In witness whereof, I have hereunto subscribed my name in the presence of witnesses.

EDWIN N. LIGHTFOOT.

Witnesses:
GEORGE J. MALLON,
GEO. B. JONES.